April 29, 1952 — L. C. CULP — 2,594,736
PLUG VALVE
Filed Sept. 2, 1947

L. C. Culp
INVENTOR
BY *Chenowleo*
ATTORNEYS.

Patented Apr. 29, 1952

2,594,736

UNITED STATES PATENT OFFICE 2,594,736

PLUG VALVE

Lide C. Culp, El Dorado, Ark., assignor of one-half to Hugh J. Wilder, Tyler, Tex.

Application September 2, 1947, Serial No. 771,709

1 Claim. (Cl. 277—41)

This invention relates to valves and more particularly and specifically to a novel and improved choke type plug valve of the type widely used to regulate the amount of flow of a fluent material therethrough.

Primarily, this valve has been designed for use in oil lines and the like which carry crude and unrefined, as well as refined, oils and petroleums. Valves used in these lines are subject to high abrasive action from impurities and insolubles and to high corrosion action caused by the high acidity of the many products transferred therethrough, thus necessitating frequent repair and replacement of those valves now in such service. The valve structure set forth in the present invention is of an improved structure and operation presenting many, and much needed, advantages over those valves being used in present day service.

The primary object of this invention resides in the provision of a valve structure in which the material flow therethrough may be varied over a widely desired range without subjecting the closing seat of the valve to abrasive wear and corrosion and maintaining said valve in a perfectly lapped and lubricated condition at all times.

Another object of this invention lies in the provision of a valve of the constructive advantages set forth which is so constructed and operated as to eliminate any possibility of the valves freezing as do many of the valves of the type now in use.

Still another object of this invention is the provision of a valve of the character set forth which is equipped with a guided, controlled operating handle which allows only the proper operation of the valve and eliminates the chance of misuse and damage to the valve through ignorance or carelessness on the part of the operator.

Still a further object of this invention is the provision of a plug valve having the objects and advantages set forth which is of a simple and durable construction having a minimum requirement for repair and adjustment, and a valve which is efficient and reliable in use which is of a relative cheap manufacture.

Still further improvements and advantages of this invention will readily appear to those skilled in the art when the following description is read in the light of the accompanying drawings in which.

Figures 1, 2:
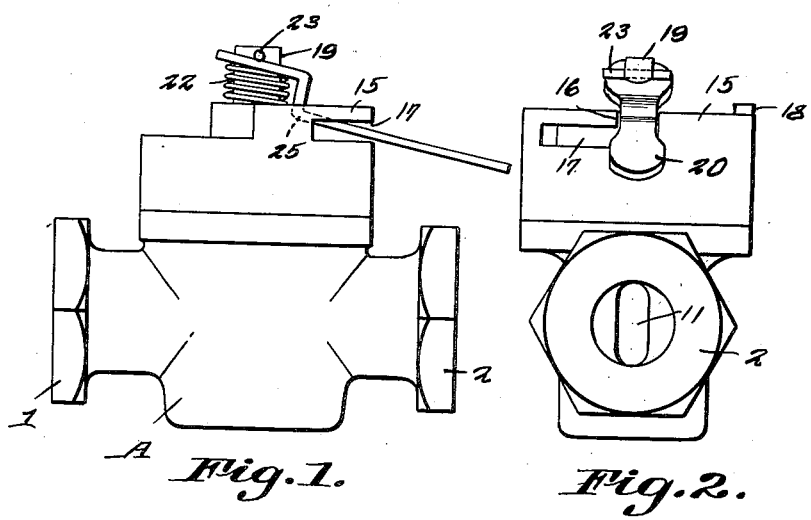
Fig. 1 is a front elevation of the valve.
Fig. 2 is a side elevation of the valve.
Figures 3, 5:
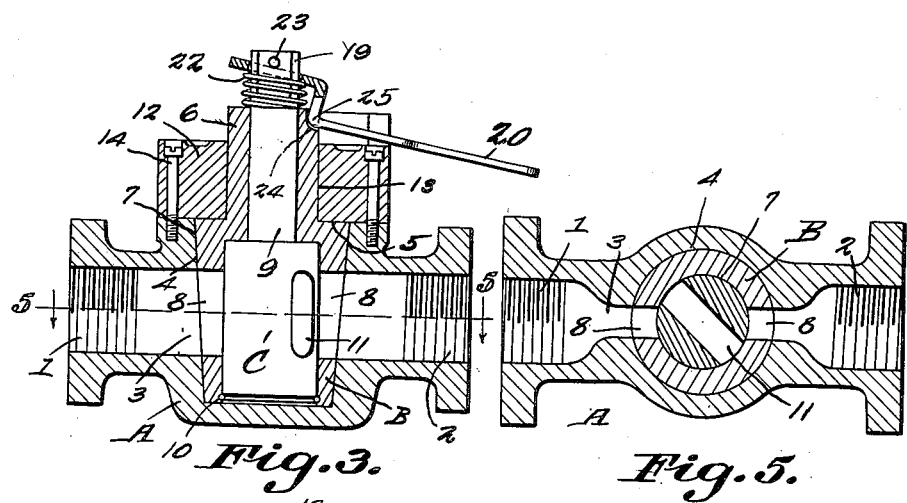
Fig. 3 is a vertical cross section of the valve as illustrated in Fig. 1.
Fig. 5 is a horizontal section taken on line 5—5 of Fig. 3.
Figure 4:
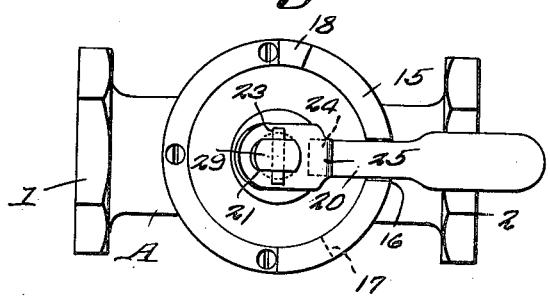
Fig. 4 is a top plan view of the valve.

Referring now to the accompanying drawings which are merely illustrative of the preferred embodiment of this invention and in which like characters indicate similar parts throughout, A designates the valve body provided with opposed inlet and outlet ports 1 and 2 each of which opens through restricted, inner throats 3 into a central, tapered chamber 4 which opens into the valve body from the top.

A tapered plug valve B is revolubly seated, in lapped relationship, in the chamber 4. This tapered plug valve B is shouldered, as at 5, in coincidence with the top of the valve body where it projects above the chamber 4 in the form of a hollow circular stem 6 of a lesser diameter than the plug. The hollow stem 6 opens into a straight walled cylindrical chamber 7 formed within the plug and which opens through the bottom thereof. This inner chamber 7 opens outwardly into the restricted throats 3 through a pair of diametrically opposed slotted ports 8 in the plug walls.

A solid cylindrical choke plug C with an extended stem 9 is inserted upwardly into the tapered plug B to loosely, rotatably seat within the chamber 7 and to dispose the stem 9 within the hollow stem 6 of the tapered plug to project for a spaced distance outwardly thereabove. A snap ring arrangement 10 within the open bottom of the tapered plug B locks the choke plug C therein. The choke plug C is provided with diametric passage 11 therethrough adaptable to conform with the ports 8 in the outer tapered plug B.

A solid bonnet member 12, having a central stem receiving aperture 13, is seated over the stems 6 and 9 upon the valve body and is secured thereto by suitable studs 14, to enclose the working members of the valve.

The bonnet member 12 is provided with a raised circumferential parapet 15 formed about substantially one-half of the periphery thereof, and this parapet 15 is divided intermediate its length by a vertical slot 16 which extends downwardly therein for a short spaced distance and there opens in a clockwise direction into a horizontal slot 17 which extends for a substantial length of the parapet in that direction. The counterclockwise end of the parapet 15 is provided with a raised stop-lug 18.

The upper termination of the inner stem 9, which projects above the outer stem 6, is formed in an oval shaped end 19, and a perpendicular stepped handle 20 is provided on the upper step with an oval opening 21 of a slightly larger area than the stem end 20 allowing the handle to be loosely seated thereover upon a coil spring 22 about the stem end. A pin 23 is secured through the upper end of the stem to prevent the spring from forcing the handle off of the stem.

The outer stem 6 is provided with a notched seat 24 in its upper terminating circumference which is adaptable to receive the stepped portion 25 of the handle 20 when downward pressure is brought to bear on the outer end of the handle 20, this action also enabling the handle to be depressed in the slot 16 and turned clockwise in the slot 17.

The valve is in a closed position when the handle is as far in the slot 17 in a clockwise direction as it can be moved. The aforesaid position of the handle places the tapered plug ports 8 out of alignment with the restricted throats 3 and the choke plug passageway 11 out of alignment with the plug ports 8 and further out of alignment with the throats 3 than are the ports 8.

By turning the handle 20 in a counterclockwise direction to a position directly beneath the slot 16 the outer tapered plug is caused to move with the handle, by virtue of the engagement of the handle step portion 25 with the inner stem seat 24, and this places the ports 8 of the outer plug in alignment with the throats 3 and, likewise the handle rotation will revolve the inner plug to bring the passageway 11 therein to the same relative position to the throats 3 as was previously occupied by the ports 8 of the tapered plug.

Thus the tapered plug is opened without allowing passage of the fluent thereby during the opening operation thus eliminating abrasion and wear to the plug.

Next the handle is allowed to move upward through the slot 16 under the lifting resiliency of the spring 22 and in doing so the handle step 25 is disengaged from the notched step 24 of the outer stem. Then when the handle is again rotated in a counterclockwise position to a position against the raised stop lug 18 the inner choke plug C will be rotated independently within the tapered plug to align the passageway 11 with the now aligned ports 8 and the throats 3.

Any and all flow control regulation is done by rotation of the choke plug to partially throttled positions through movement of the handle between the slot 16 and the stop lug 18. This regulation eliminates all wear to the tapered plug, and because of the loose seating fit of the choke plug freezing and undue wear are prevented in the working members of the valve structure.

The closing of the valve is the converse of the opening operation with the choke plug closing first stopping all flow and then the tapered plug positively closing off all flow under diminished pressure thus eliminating abrasive wear and preventing foreign matter from being forced between the plug and the tapered seat.

The only replacement that would ever become necessary would be that of the choke plug which can be quickly and easily replaced at any extremely low cost relative to replacing lapped plugs of the present day valves thus effecting a tremendous overall savings to those operators using a great number of these flow controlling pipe line valves.

Having thus described the function, structure, and operation of this invention what I desire to claim is:

A flow control valve comprising a valve body member having opposed inlet and outlet ports and provided with a tapered chamber formed perpendicularly between said ports, a hollow tapered plug revolubly lap seated in the tapered chamber and provided with a hollow stem having an upper end projecting out from the body member, opposed ports in the side walls of the tapered plug adapted to register with the inlet and discharge ports of the body member, a choke plug loosely and revolubly seated within the hollow tapered plug, having bores adapted to register with the bores of the tapered plug, controlling the flow of material through the plug and having a stem projecting through and beyond the hollow stem of said tapered plug, a bonnet member seated over said stems enclosing the top of the valve body member, a handle mounted on the projected end of said stem, for vertical swinging movement with respect to the stems, said bonnet member being provided with a raised parapet about a portion of the periphery thereof, said parapet having a vertical slot dividing the parapet substantially at its center, said slot opening horizontally in a clockwise direction into a slot projecting for substantially the remainder of the parapet in that direction, a perpendicularly stepped handle, said handle having an opening in which the extended end of the hollow supported plug stem is disposed, the opening in the handle being appreciably larger than the diameter of said plug stem for vertical tilting movement on the plug stem, a spring mounted on the stem of the solid choke plug normally urging the handle upwardly, the upper circumferential edge of the hollow stem being notched to receive the stepped portion of the handle when depressed thereinto, effecting the rotation of said hollow tapered plug as the handle is rotated, and the extended portion of the handle being adapted for sliding fit within the parapet slots.

LIDE C. CULP.

REFERENCES CITED

The following references are of record in the file of this patent:

UNITED STATES PATENTS

| Number | Name | Date |
| --- | --- | --- |
| 661,175 | Haigh | Nov. 6, 1900 |
| 1,181,662 | Hartman | May 2, 1916 |
| 1,597,523 | Grund | Aug. 24, 1926 |